United States Patent
Fischer et al.

(10) Patent No.: US 7,162,543 B2
(45) Date of Patent: Jan. 9, 2007

(54) PROCESS FOR SYNCHRONIZING DATA BETWEEN REMOTELY LOCATED DEVICES AND A CENTRAL COMPUTER SYSTEM

(75) Inventors: Claudius Fischer, Schwetzingen (DE); Thorsten Stephan, Heidelberg (DE); Markus Schmidt, Heidelberg (DE); Jochen Hertweck, Schwetzingen (DE); Franz Müller, Stutenser (DE)

(73) Assignee: SAP AG, Walldorf (DE)

( * ) Notice: Subject to any disclaimer, the term of this patent is extended or adjusted under 35 U.S.C. 154(b) by 603 days.

(21) Appl. No.: 10/164,225

(22) Filed: Jun. 5, 2002

(65) Prior Publication Data
US 2003/0037254 A1   Feb. 20, 2003

Related U.S. Application Data

(60) Provisional application No. 60/296,993, filed on Jun. 8, 2001, provisional application No. 60/296,234, filed on Jun. 6, 2001.

(51) Int. Cl.
*G06F 15/16* (2006.01)

(52) U.S. Cl. .................... 709/248; 709/220; 709/224; 709/229; 709/236; 707/201; 455/430

(58) Field of Classification Search ................ 709/220, 709/248, 224, 229, 236; 707/201; 455/430
See application file for complete search history.

(56) References Cited

U.S. PATENT DOCUMENTS

| | | | |
|---|---|---|---|
| 5,428,729 A | 6/1995 | Chang et al. | |
| 5,485,503 A * | 1/1996 | Diem .................. | 340/7.29 |
| 5,684,984 A | 11/1997 | Jones et al. | |
| 5,752,042 A | 5/1998 | Cole et al. | |
| 5,819,283 A | 10/1998 | Turkowski | |
| 5,862,346 A | 1/1999 | Kley et al. | |
| 5,870,610 A | 2/1999 | Beyda | |
| 5,870,759 A * | 2/1999 | Bauer et al. ................ | 707/201 |
| 5,923,552 A | 7/1999 | Brown et al. | |
| 6,006,274 A | 12/1999 | Hawkins et al. | |
| 6,052,588 A * | 4/2000 | Mo et al. .................... | 455/430 |
| 6,112,246 A | 8/2000 | Horbal et al. | |
| 6,131,192 A | 10/2000 | Henry | |
| 6,134,552 A | 10/2000 | Fritz et al. | |
| 6,138,153 A | 10/2000 | Collins et al. | |
| 6,141,010 A | 10/2000 | Hoyle | |
| 6,202,085 B1 | 3/2001 | Benson et al. | |
| 6,202,207 B1 | 3/2001 | Donohue | |
| 6,226,739 B1 | 5/2001 | Eagle | |
| 6,237,092 B1 | 5/2001 | Hayes, Jr. | |
| 6,243,468 B1 | 6/2001 | Pearce et al. | |

(Continued)

FOREIGN PATENT DOCUMENTS

EP        0841616        8/2005

(Continued)

OTHER PUBLICATIONS

Gilles Roussel. "Le Protocol TCP", Online', Oct. 19, 1988, XP002237956.

(Continued)

*Primary Examiner*—Patrice Winder
*Assistant Examiner*—Liang-che Alex Wang
(74) *Attorney, Agent, or Firm*—Kenyon & Kenyon LLP (57) ABSTRACT

A process for synchronizing data between a remotely located device, such as a personal digital assistant, Internet-enabled phone, handheld computer, laptop or desktop computer, and a central computer system. The data may be related to offline applications running on the device.

59 Claims, 8 Drawing Sheets

U.S. PATENT DOCUMENTS

| | | |
|---|---|---|
| 6,282,711 B1 | 8/2001 | Halpern et al. |
| 6,295,645 B1 | 9/2001 | Brewer |
| 6,311,321 B1 | 10/2001 | Agnihotri et al. |
| 6,338,068 B1 | 1/2002 | Moore et al. |
| 6,349,333 B1 | 2/2002 | Panikatt et al. |
| 6,349,408 B1 | 2/2002 | Smith |
| 6,366,876 B1 | 4/2002 | Looney |
| 6,381,742 B1 | 4/2002 | Forbes |
| 6,390,920 B1 | 5/2002 | Infiesto et al. |
| 6,430,599 B1 | 8/2002 | Baker et al. |
| 6,466,950 B1 * | 10/2002 | Ono .................. 707/201 |
| 6,481,632 B1 | 11/2002 | Wentker et al. |
| 6,496,979 B1 | 12/2002 | Chen et al. |
| 6,510,466 B1 | 1/2003 | Cox et al. |
| 6,553,375 B1 | 4/2003 | Huang et al. |
| 6,560,655 B1 | 5/2003 | Grambihler et al. |
| 6,574,561 B1 * | 6/2003 | Alexander et al. ........... 702/5 |
| 6,578,054 B1 | 6/2003 | Hopmann et al. |
| 6,615,276 B1 | 9/2003 | Mastrianni et al. |
| 6,714,933 B1 | 3/2004 | Musgrove et al. |
| 6,742,025 B1 * | 5/2004 | Jennery et al. .......... 709/220 |
| 6,785,721 B1 | 8/2004 | Immerman et al. |
| 6,801,940 B1 | 10/2004 | Moran et al. |
| 6,813,777 B1 | 11/2004 | Weinberger et al. |
| 6,845,383 B1 | 1/2005 | Kraenzel et al. |
| 6,845,503 B1 | 1/2005 | Carlson et al. |
| 6,915,525 B1 | 7/2005 | Ozawa |
| 6,957,186 B1 | 10/2005 | Guheen et al. |
| 2001/0034771 A1 | 10/2001 | Huetsch |
| 2001/0049624 A1 * | 12/2001 | Uyama et al. ............... 705/14 |
| 2002/0023143 A1 * | 2/2002 | Stephenson et al. ....... 709/218 |
| 2002/0049603 A1 | 4/2002 | Gaurav Mehra et al. |
| 2002/0138582 A1 | 9/2002 | Chandra et al. |
| 2002/0147850 A1 * | 10/2002 | Richards et al. ........... 709/248 |
| 2002/0161826 A1 | 10/2002 | Arteaga et al. |
| 2002/0174372 A1 | 11/2002 | Venkataraman |
| 2002/0178218 A1 | 11/2002 | Butlin |
| 2003/0023657 A1 | 1/2003 | Fischer et al. |
| 2003/0037181 A1 | 2/2003 | Freed |
| 2003/0037254 A1 | 2/2003 | Fischer et al. |
| 2003/0046017 A1 | 3/2003 | Fischer et al. |
| 2003/0046448 A1 | 3/2003 | Fischer et al. |
| 2003/0055927 A1 | 3/2003 | Fischer et al. |
| 2003/0056207 A1 | 3/2003 | Fischer et al. |
| 2003/0088483 A1 | 5/2003 | Moyer |
| 2004/0015566 A1 | 1/2004 | Anderson et al. |

FOREIGN PATENT DOCUMENTS

| | | |
|---|---|---|
| WO | WO 00/79408 A2 | 5/2000 |
| WO | WO 00/62576 | 10/2000 |
| WO | WO 01/27806 A1 | 10/2000 |
| WO | WO 01/11466 | 2/2001 |
| WO | WO 01/77822 A2 | 4/2001 |

OTHER PUBLICATIONS

Rubini, Alessandro and Corbet Jonathan, "Linux Device Drivers: Second Edition", Jun. 2001, XP002237957.

Altiris eXpress, SW Delivery Solution 5.1, User Guide, Jun. 5, 2001, Copyright © 2001 Altiris Inc.

Jesper Andersson, "A Deployment System for Pervasive Computing", Department of Computer and Information Science, Linköpings universitet, Feb. 15, 2000.

*Systems Management Server 2.0 Client Features*; retrieved Apr. 6, 2004, from http://www.winnetmag.com/Articles/Print.cfm?ArticleID=5189.

S. Ramamurthy et al., "Optimising Thin Clients for Wireless Computing via Localization of Keyboard Activity", Conference Proceedings of the 2001 IEEE International Performance, Computing, and Communications Conference, Phoenix, Arizona, Apr. 4-6, 2001, pp. 249-252.

Oracle 8i Lite, Web-to-go Implementation Guide, Release 1.3, Part No. A86144-01, Copyright © 2000, Oracle Corporation.

European Patent Office Search Report from File No. RS 109268 DE, Apr. 11, 2003.

Internet Archive Wayback Machine: Search results for Jan. 1, 1996-Mar. 25, 2003. Mar. 25, 2003, XP-002236032.

Leeds, Matthew, "Macworld: Software Updating Services", Oct. 1997, XP002237445.

Sars, C., et al., "Design Patterns and the Java AWT", Sep. 3, 1996, XP002097531.

Schettino, John, "Re: Win CE vs Newton (Pro Choice/Pro life) Flaim bait", Online', Dec. 12, 1996, XP002235545.

Sundsted, Todd, "Introduction to the AWT", Java World, Jun. 1996, XP002190629.

Taylor, Richard, "Re: Newton Web Server", Online', Apr. 2, 1998, XP002235544.

Throop, Wayne, "Re: WinCE files sharing to Linux/BeOS?", Online', Jul. 20, 2000, XP002235543.

* cited by examiner

Fig. 1

| 50 Application/Service |||||
|---|---|---|---|---|
| 145 | 5 EBP || 10 ISALES | 15 MY |
| | 20 Basket Class | 20 Catalog Class | 30 Methods | 35 Methods |

| 40 Mobile Device File Programming I/F |
|---|

| 45 Mobile Device |
|---|

PROCESS FOR SYNCHRONIZING DATA BETWEEN REMOTELY LOCATED DEVICES AND A CENTRAL COMPUTER SYSTEM

CROSS-REFERENCE TO RELATED APPLICATIONS

This application arises from provisional applications 60/296,234 filed on Jun. 6, 2001 and 60/296,993 filed on Jun. 8, 2001 and claims the benefit thereof.

FIELD OF THE INVENTION

This invention relates to providing a process for synchronizing data between remotely located devices, such as handheld computers, Internet capable phones, personal digital assistants (PDAs), laptops, and desktop computers, and a central computer system through a connection such as the Internet or another network. The data to be synchronized may come about from business applications running offline on the devices. The central computer system may be a business electronic commerce system.

BACKGROUND OF THE INVENTION

Many businesses have a need to exchange information between a central location and employees operating in the field. In the computerized age, most of this information is probably stored on a computer system. Because many field employees may have a laptop computer, handheld computer or personal digital assistant with which to work. Thus, it would be beneficial to enable the exchange of information between the computer system and the devices deployed in the field.

One example of a use for such a system would be a field engineer that responds to trouble calls. At the start of a day, the engineer may need to determine his daily tasks and at the end of the day he may need to report it back to his employer. Rather than get this information verbally, it would make more sense to download the tasks he has to perform that day from a central computer system. When he finishes the day, he would respond to the computer system with reports relating to the calls, setting forth the trouble found, the repair performed and the time it took to complete the job.

Another example may be a sales person who is calling on a customer. If that customer wants to change a previously placed order, the sales person may need to record the modified order and place that order for the customer. Doing this through a computer system would make much more sense than doing it verbally and would provide a record of the transaction.

Certain companies that have a need for providing devices like this may have certain employees that need more processing power than others. Thus, it may be necessary to deploy more than one type of mobile device. Some people may end up using personal digital assistants, while others use handheld computers, while still others use laptops. Others, that do not travel, may use desktops. For ease of use and management, it then becomes important that the software being used to perform the various tasks be platform-independent so that it may run on all these devices.

It also is important to permit the information to be entered on the devices while the device is off-line. Field personnel are not always in locations where they can establish connectivity to the computer system. It would be beneficial to permit the field personnel to enter the information they need to transmit back to the computer system when it is convenient for them, such as immediately following the repair, rather than making them enter the information while the device is on-line with the computer system.

It is also important for ease of use that when people are working off-line, the software operates in a similar way with the same look and feel as though they were actively operating on-line.

Because computer systems of this type can have hundreds or thousands of mobile device users that access the computer system from time-to-time, an easy way to keep track of what software is loaded on what device and to control the same is imperative. Thus, an easy way to control, manage, and monitor software installation on the devices is needed.

A need exists for a synchronization process for synchronizing data between remotely located devices and computer systems.

SUMMARY OF THE INVENTION

An embodiment of the present invention provides a process for synchronizing data between a remotely located device and a central computer system.

Another embodiment of the present invention provides a process for synchronizing data associated with applications running offline on a remotely located device with a central computer system.

As such, it is an object of the present invention to permit the synchronization of data between a remotely located device and a central computer system.

It is a further object of the present invention to permit the synchronization of data associated with applications running offline on a remotely located device with a central computer system.

DESCRIPTION OF THE PREFERRED EMBODIMENTS

The present invention will be better understood by reference to the accompanying drawings.

Figure 1:
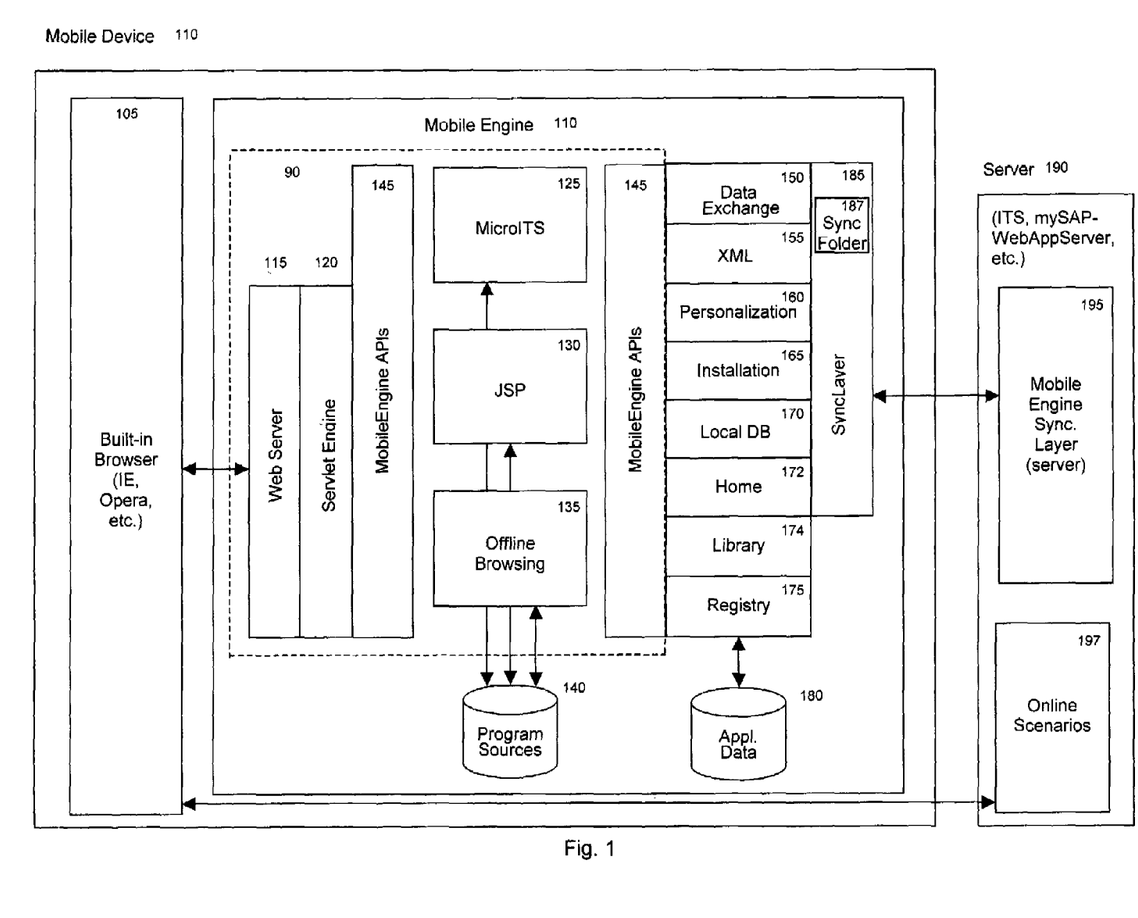
FIG. 1 is a block diagram of a mobile device according to an embodiment of the present invention.

FIG. 1 depicts a mobile device according to an embodiment of the present invention. Mobile device 100 may be a PDA, a laptop computer, an Internet capable phone, or another similar device. Preferably, the mobile device has an operating system with Java VM 1.1.4 or PersonalJava and at least about 5 MB of memory. Preferably, mobile engine 110 is based on Java, so that it may run on any platform supporting Java.

Mobile device 100 contains an Internet browser 105. It also contains mobile engine 110. Mobile engine 110 should be capable of generating any standard markup language, such as HTML, so that Internet browser 105 may be a standard browser, such as Microsoft Internet Explorer or Netscape, rather than a proprietary one. However, a proprietary browser could be used on mobile device 100 in addition to or in lieu of the standard browser if desired.

When mobile device 100 is operating with a computer system over the Internet in an online mode and applications are being run from computer system 200 across the connection, browser 105 is connected to computer system 200, such as an application server, in a traditional manner represented by box 197.

When mobile device 100 is operating in an offline mode and applications are being run locally on mobile device 100, mobile engine 110 is engaged. Mobile engine 110 contains two major components: a Java plug-in 90 and various components for data synchronization and deployment. The Java plug-in contains web server 115, servlet engine 120, modular offline application building blocks 125, 130 and 135, and API layer 145. All of the information to start and run the Java plug-in is preferably held in separate property files. For instance, the information related to the web server, including host, port, and wwwroot, can exist in a file named webserver.properties. The information related to mappings, such as URL to servlet mappings, can exist in a file named mappings.properties. The information relating to mimes, such as mime types, can exist in a file named mime.properties.

Web server 115 is preferably programmed in Java and provides the ability for the user of mobile device 100 to log onto web server 115 contained within mobile device 100 when operating offline. By doing so, the user is provided with the same or similar look and feel to operating online over the Internet and can run the same applications offline that the user could run over the Internet in an online mode. Preferably, web server 115 is single threaded and has a small footprint.

Web server 115 is connected to servlet engine 120. Servlet engine 120 enables the mobile device's user to engage various offline applications locally on mobile device 100 through web server 115. Servlet engine would preferably be based upon Java Servlet API 2.1. Web server 115 and servlet engine 120 preferably would meet the Sun Java WebServer 2.0 Specification.

Various different programming models can be deployed in mobile engine 110 as modular offline building blocks. For instance, a proprietary model 125, like SAPMarket's Micro-ITS, may be deployed which is designed to maximize certain types of transactions based upon the foreseen use of mobile device 100. MicroITS model 125 contains a flow logic parser, HTML business parser, language resource parser/preparser and module provider.

A Java Server Pages model 130 may be deployed to take advantage of Java features. Java Server Pages model 130 would preferably be based upon TomCat.

Other models, such as custom plug-in model 135, can also be used as needed. Custom plug-in model would permit users to implement their own logic. These other models may be proprietary or standards-based. By using modular offline application building blocks and permitting the use of one or more models, the mobile engine architecture is easy to enhance or modify. Moreover, new offline application building blocks can be downloaded and installed via the deployment and installation process discussed hereinafter with respect to FIGS. 6 and 7. Mobile engine API layer 145, which will be discussed in more detail below, provides independence between modular offline application building blocks 125, 130, 135 and servlet engine 120.

Modular offline application building blocks 125, 130, and 135 utilize programming sources stored in memory 140. While memory 140 is shown within mobile engine 110, it may be located elsewhere.

Mobile engine API layer 145 forms an interface between the various programming models 125, 130 and 135 and the application data that resides on database 180 within mobile device 100. While database 180 is shown within mobile engine 110, it may be located elsewhere. By providing API layer 145, alternative programming models, offline applications and services may be incorporated, activated or substituted for existing models, offline applications and services in the future without having to completely reprogram mobile engine 110. API layer 145 contains file I/O APIs, database APIs, synchronization layer APIs and XML parsing APIs.

Figure 2:
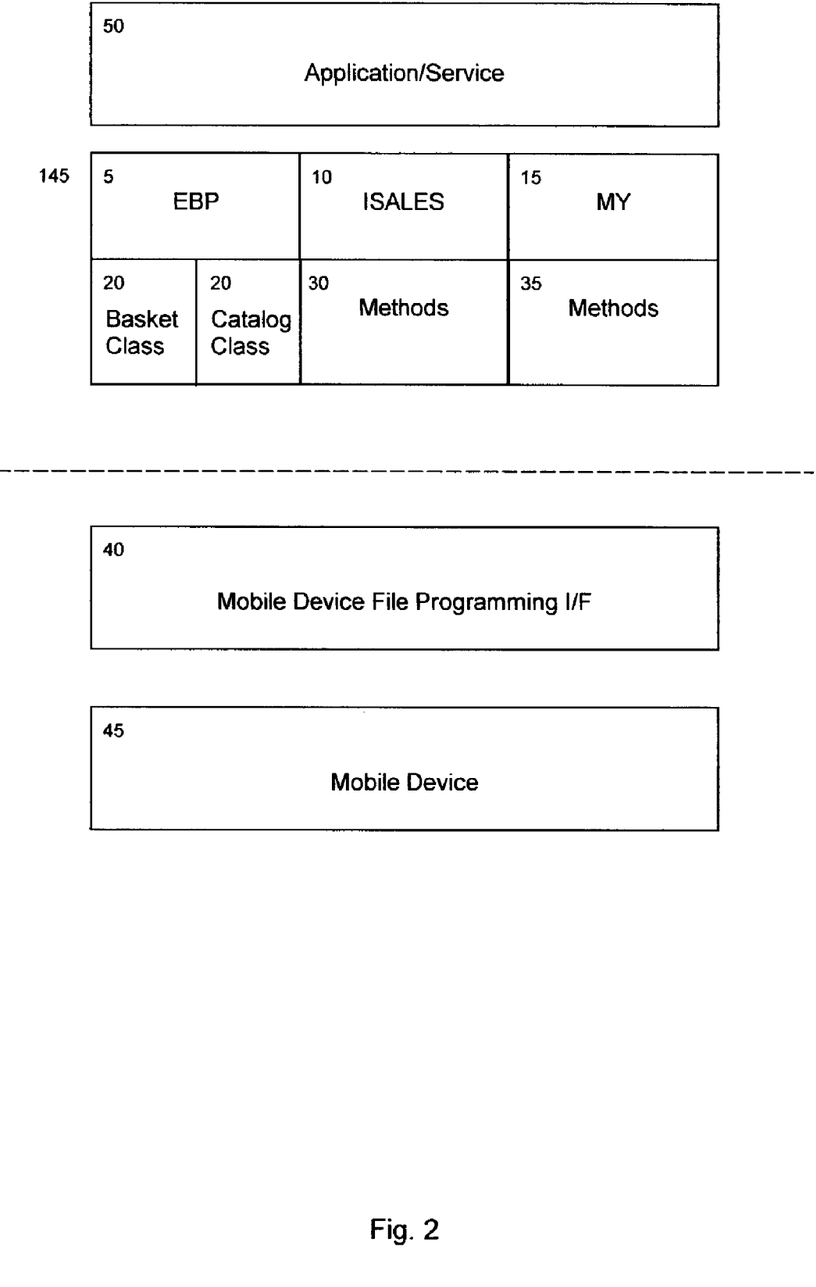
FIG. 2 is a block diagram of a mobile device having an API layer according to an embodiment of the present invention.

This mobile engine API layer 145 also provides device independence so that any application can run on any device without specific programming for device specific dependencies. Referring now to FIG. 2, API layer 145 provides an interface between application or service 50 and the mobile device's file programming interface 40 on the mobile device platform 45. Service 50 may be any of the previously mentioned services, such as data exchange 150, or the like, or an offline application.

API layer 145 consists of various module providers, such as EBP.class 5, ISALES.class 10 and MY.class 15. Java methods grouped in packages 20, 30, and 35, such that all methods needed for a specific function are part of a corresponding package, also form part of API layer 145. These methods can be called by the appropriate module provider.

For instance, Enterprise Buyer Professional is a product available from SAP Markets, Inc. It provides the ability to coordinate the Internet business procurement process. The product permits the creation of shopping baskets and catalogs. A package for Enterprise Buyer Professional would include the module provider of EBP.class 5 and the groups of methods basket.class 20a and catalog.class 20b.

Module providers 5, 10, and 15 instantiate the appropriate Java method calls and make them available for the flow logic in an application or service. There is always one module provider assigned to each package of the API layer 145.

Various services that can be integrated that operate through API layer 145 are shown. Data exchange 150 is utilized during a synchronization procedure when data is to be exchanged between a computer system and mobile device 100.

Many business applications utilize XML. So an XML translation service 155 can be provided.

A personalization service 160 can be included. Personalization permits the manipulation of settings necessary to operate within a given server environment, such as a server URL, logon data, proxy, etc. Multiple user control can be included if more than one user of a device would be anticipated.

An installation service 165 can also be provided. Installation service 165 automatically installs or uninstalls offline applications, offline application building blocks and other software so that the device is outfitted as it should be based upon a deployment console, as will be discussed in detail later, located at the computer system. The installation service 165 creates a new entry in registry service 175 (discussed below) when a new application is installed and deletes an entry when an offline application is deleted. This function occurs in the background so as to be transparent to the user.

Local database access 170 is provided to permit access to database 180.

A home service 172 can be provided that sets up a homepage that the user accesses offline that provides links to the offline applications resident on the mobile device. Preferably, the synchronization service is accessible through this page by clicking on an icon, for example.

Library service 174 offers standard functionality for application methods. It handles file operations and parsing. Library service 174 contains an open catalog interface and parser for XML parsing, as well as a local data storage encryptor.

Registry service 175 maintains a list of all installed offline applications. Alternatively, registry service 175 can maintain a list of all installed software subject to deployment from the deployment console, which would include at least offline applications and modular offline application building blocks. Preferably, information from the registry 175 is provided to the deployment console during a synchronization and used by the deployment console to make sure that mobile device 100 is outfitted as it should be. The operation of registry service 175 will be discussed in more detail later.

Synchronization layer 185 is part of mobile engine 110. Synchronization layer 185 controls the synchronization of data on mobile device 100 with computer system 200 once the mobile device achieves connection through the Internet (or alternatively, through another means) to computer system 200, such as an application server, as is represented by box 195. The synchronization layer 185 does this by sending the data containers resident in synchronization folder 187. Synchronization layer 185 preferably will contain an inbound/outbound queue, module(s) supporting different types of synchronization, a file handler, an error handler, a SOAP connector for XML, a data transmission security module, a synchronization security module and an authority checker. The details of the creation of such components would be apparent to one skilled in the art. This synchronization layer 185 and synchronization process will be discussed in greater detail later.

A few examples of offline applications that can be run on mobile device 100 are now discussed. Such applications can be created through the use of a tool such as Web Application Builder by SAP, AG. One such application is an easy shopping application. Easy shopping permits one-step wireless shopping and buying, personalized product offerings, seamless integration into a full internet sales cycle, seamless integration into a procurement cycle, intelligent status tracking/synchronization, easy changing web templates, XML catalog content exchange, and provides the identical look and feel for sales and procurement. Functions supported could be catalog, shopping cart, synchronization, and order status. The catalog can include search functionality and can hierarchically group products. The shopping basket allows for the creation of multiple orders and provides order status information. When this data from this application is synchronized with the central computer system, catalog content, orders, and software can be updated.

Manager's inbox is another possible offline application. Manager's inbox contains an inbox overview listing incoming messages and work items. View selection can be available. When an inbox item is clicked, the message or the work item can be displayed. Work item details such as the ability to approve or reject a work item and forms can be shown. During synchronization, inbox items, item details, and approvals/forms would be updated.

Plant maintenance is another application. Plant maintenance includes an order section. Functions possible with plant maintenance could include searching for open or released, orders, selecting operations, and adding components. The catalog function can provide a hierarchical view catalog with search functionality. During synchronization open and released orders would be exchanged, catalogs would be updated and new components would be added.

The discussion above, with respect to FIG. 1, focused on the use of the framework with a mobile device. Another use for this framework would be to install it as described above on a desktop computer rather than a mobile device or on a laptop that has a more or less permanent network connection. Having such a framework would permit users to run applications offline and then exchange information between the desktop and the computer system during a synchronization process. Thus, when offline application data needs to be provided to the computer system, it is provided to the system through the synchronization layer. The synchronization process can occur upon the clicking of an icon or hyperlink or the like, or alternatively, because a network connection does exist, it can automatically be provided without user intervention when data is available to be sent.

By using the mobile engine framework on a desktop, or laptop with a somewhat permanent network connection, the volume of exchange of information between the computer system and the desktop can be minimized. This would mean that entire HTML pages would no longer need to be exchanged. Instead, just the data of the business objects would be exchanged.

Figure 3:
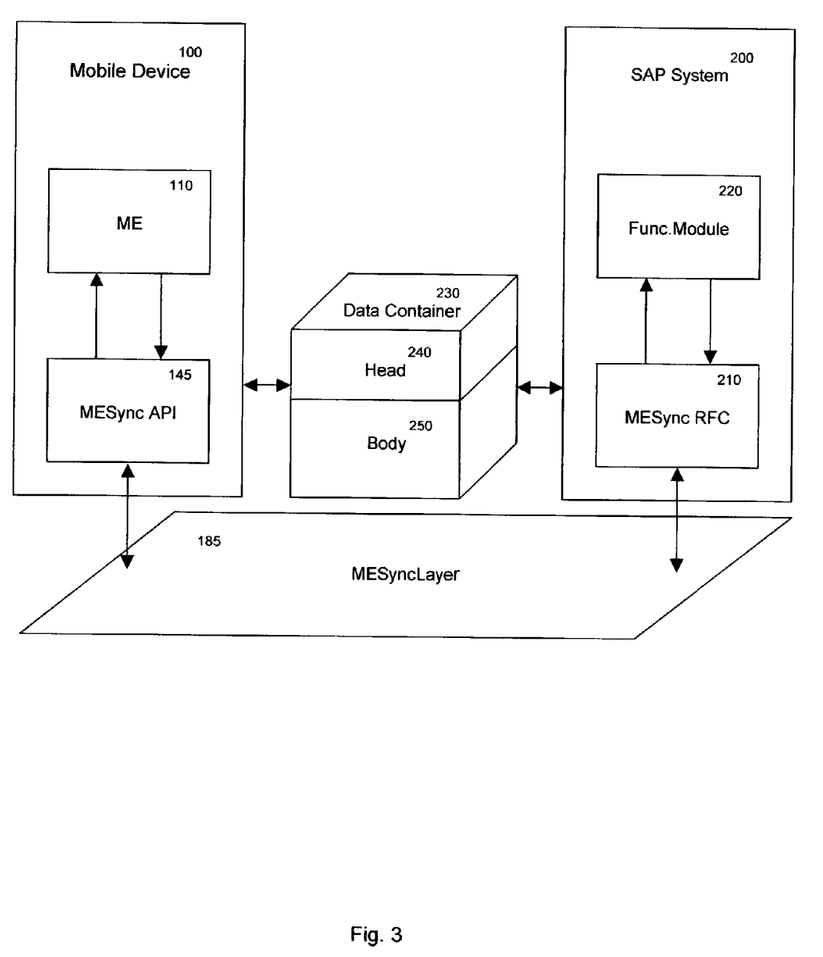
FIG. 3 is a block diagram of a synchronization system according to an embodiment of the present invention.

In FIG. 3, a synchronization system according to an embodiment of the present invention is shown. Mobile device 100 is shown connected to computer system 200 through a connection such as the Internet. Other networks or a direct connection can alternatively be used. The synchronization process could begin through clicking on an icon, button, hyperlink or the like, on a home page displayed via the browser. Alternatively, it could automatically occur upon a link being established between mobile device 100 and computer system 200.

Sample Java code for initiating a synchronization process follows:

```
try{
    SyncOutboundContainer.doSync ();
} catch (SyncException ex) {
    // do something
}
```

Mobile engine 110, through API layer 145 and synchronization layer 185, talks with functional module 220 on computer system 200 through synchronization RFC 210. This communication is carried out through the use of data containers, such as data container 230.

Data container 230 is normally made up of a header 240 and a body 250. However, certain types of containers may not require a body 250. The header 240 can be made up of the following parts: 1) a container ID that uniquely identifies the particular container; 2) an identification of the user of the device; 3) an identification of the type of container; 4) the method describing which function module should be called in the computer system to process the data; 5) the date the container is sent; 6) the time the container is sent; 7) the date the method was executed to create the data container; 8) the time the method was executed; and 9) the status relating to the data. The body 250 of container 230 can be made up of a container ID, line number, field name and field value.

The following is sample Java code for an outgoing data container:

```
String MyOwner; // best the username on the PDA
try{
    SyncOutboundContainer syncOutboundContainer = new
SyncOutboundContainer (MyOwner, GETAPPROVERLIST );
    syncOutboundContainer.open ();
        String value_for_I_CFGUID = // do something to fill
value
        syncOutboundContainer.addItem("I_CFGUID", 0
,value_for_I_CFGUID);
        String value_for_I_OBJTYPE = // do something to fill
value
        syncOutboundContainer.addItem("I_OBJTYPE", 0
,value_for_I_OBJTYPE);
        int NoOfLinesInTable_E_APPROVER;
        for (int line=0; line < NoOfLinesInTable_E_APPROVER ;
line++) {
        String line_for_E_APPROVER = // do something to fill
line
syncOutboundContainer.addItem("E_APPROVER",line,line_for_E_
APPROVER);
        }
        syncOutboundContainer.close ();
} catch (SyncException ex) {
// will always happen if method "GETAPPROVERLIST " is not
registered
}
```

Figure 4:
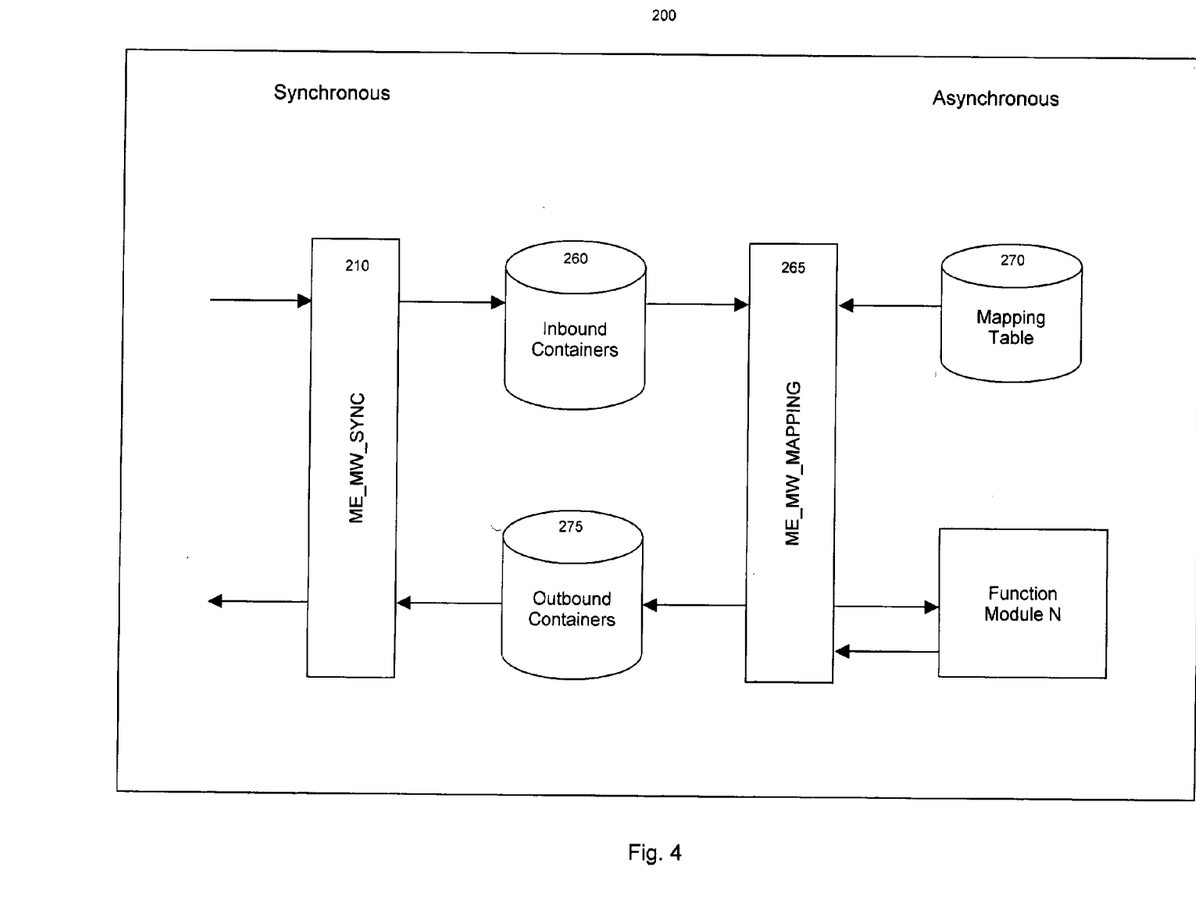
FIG. 4 is a block diagram of a computer system having a synchronization system according to an embodiment of the present invention.
Figure 5:
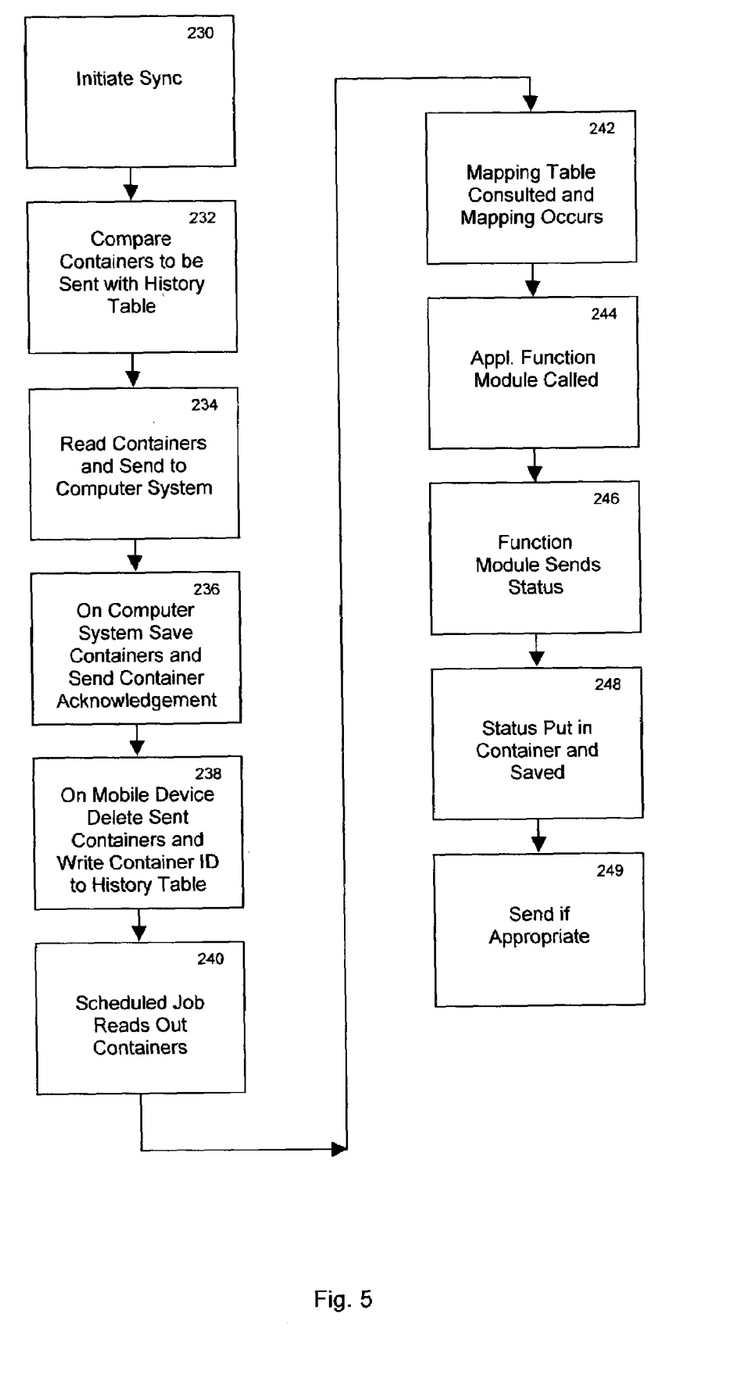
FIG. 5 is a flow chart illustrating a synchronization process according to an embodiment of the present invention.

FIG. 4 shows a computer system with synchronization capability and FIG. 5 shows a synchronization process according to an embodiment of the present invention. Preferably, the synchronization layer on the computer system has an inbound/outbound queue, module(s) for different types of synchronization, a dispatcher, a spooler, a file handler, an error handler, a mapping algorithm, a data transmission security module, a synchronization security module, and an authority checker. The details of the creation of such components would be apparent to one skilled in the art.

The embodiment shown in FIG. 5 includes an optional data preservation scheme. In order to preserve the containers, a container is maintained on at least one location. The container on the mobile device will remain on the mobile device if a problem occurs such as the connection getting lost during synchronization. If that occurs, it will be sent automatically with the next synchronization. If there is no entry in the mapping table for the function module call, the container remains in the incoming table on the computer system and a program is used to generate an automatic mapping, as will be discussed later.

If the called function module aborts and creates a dump, the container remains in the incoming table. If the called function module has the wrong interface implemented, it remains on the incoming table. If the data contained in the container is errored, the called function module returns an error message to the mobile device for processing by the offline application.

Making reference now to FIGS. 4 and 5, in step 230 of FIG. 5, the user of mobile device 100 clicks the synch icon, button, hyperlink, or the like, on the home page to initiate the synchronization process. The synchronization class reads all data containers in the synchronization folder and compares the containers with a history table that records the container IDs for containers already sent by the mobile device 100 and received by computer system 200 as shown in step 232. This is done so that duplicate containers, should they arise for some reason, such as a reboot of the mobile device, can be deleted from the mobile device without sending them.

In step 234, the synchronization class sends the remaining containers over the synchronization transport layer to synchronization RFC function module 210 in the computer system in step 252. In step 236, the synchronization RFC function module 210 writes the incoming containers into container database 260. The incoming containers are stored in database 260 as a failsafe to ensure that the containers are available should a problem occur after they are passed on to mapping layer 265. Synchronization RFC function also reads out from the outgoing container database 275 any data containers with the same class and user as those received and sends them to mobile device 100. Additionally, it sends an acknowledgement for the containers just received and stored in incoming container database 260.

In step 238, the mobile device 100 then writes the container ID referred to by the acknowledgment into a history table indicating that it was previously received by the computer system 200 and no longer needs to be maintained on the mobile device 100. The container is then deleted off of mobile device 100.

In step 240, the incoming containers are read out of inbound container database 260 by scheduled function module 265. In step 242, scheduled function module 265 consults mapping table stored in database 270 to map the data within the container so that it may be processed accordingly. Scheduled function module 265 then calls the appropriate function module 220 to execute the function required in step 244. One such function module could be an EBP processing function, for example.

In step 246, appropriate function module 220 sends back responsive data, such as status, to scheduled function module 265. Scheduled function module 265 then places the data in a container and writes it to outgoing container database 275 in step 248. Depending on the type of incoming containers, the responsive outgoing containers may be sent immediately in step 249 or may be stored until the next time a synchronization process is initiated.

At least three separate types of synchronization would preferably be supported. The first type is publish synchronization. In publish synchronization, the type of container used can be called an outbound container. The outbound container is created in mobile device 100 and, when a connection is present, is sent to computer system 200 for processing. Once it has been received by computer system 200, any return containers waiting to be sent to the same user and of the same method are sent back to the user. The connection is terminated however, prior to any outgoing containers responsive to the data just sent by the user being sent back to the mobile device.

The second type of synchronization is online processing. This type is similar to publish but includes return of responsive outgoing containers having processed data relating to the container that was just sent. With online processing synchronization, the owner sends a request-type container. First the connection is made. Then the request-type container is sent. The container is then received by the computer system 200. Because it is a request type container, the computer system returns not only any containers waiting to be sent to the same owner of the same method, but also processes the incoming container and sends a response to that container prior to the connection being terminated.

The third type of synchronization is subscribe. Subscribe synchronization is used to check on the status of previously sent containers. For instance, it can be used to check on the status of an electronic order placed through a shopping cart. The owner sends a notify-type container to computer system 200. Computer system 200 then returns containers of same method and user. Such containers need not include a body, as the status information is contained within the head of the containers.

Development tools can be utilized with the mobile engine according to an embodiment of the present invention. On the computer system, a generator tool can generate the wrapper function module that maps the generic structure of a container to the individual interface of a function module and generate the table entries for the mapping table. Preferably, the tool will utilize the programming language of the computer system. A tool can also be used as a Java class generator to handle flow logic to Java for modular offline application building blocks 125 and/or 135. Preferably, the tool utilizes Java on the mobile device. These tools are essentially translators. Creation of such translators would be well within the abilities of one of ordinary skill in the art. A computer aided test tool can also be created and used for modular application building blocks 125 and/or 135.

Figure 6:
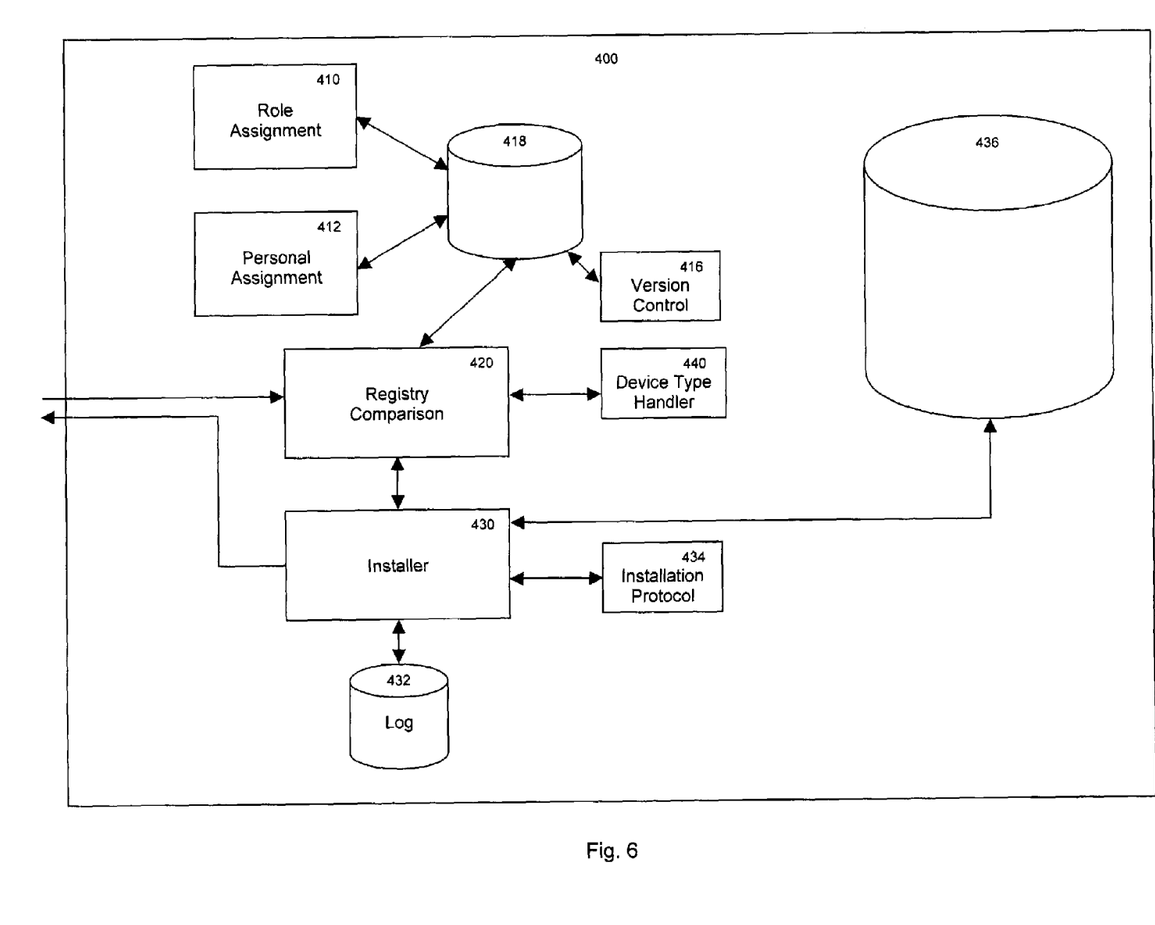
FIG. 6 is a block diagram of a deployment console according to an embodiment of the present invention.

Referring now to FIG. 6, to handle the management of the myriad of differently programmed mobile devices, a deployment console 400 is resident on the computer system as one of the application function modules 220. Deployment console 400 is preferably programmed in a language supported by computer system 200. For example, if the computer system is a MySAP Workplace system by SAP, AG, then the deployment console could be programmed in ABAP.

Deployment console 400 has an overview of all installed offline applications per user and device through an installation log 432 that records that an installation has occurred whenever an offline application, modular offline application building blocks or other software is deployed and installed on a device.

Some computer systems serving a plurality of users install applications according to user roles. For example, an employee may have a role of salesman, field engineer, secretary, or the like. Role assignment module 410 permits an administrator to assign a user to a role and to assign what software should be installed for each role. A user may have one or more roles if desired.

Because, in some cases, deviation from a strict role-based regiment may be desired, personal assignment module 412 can be provided. Personal assignment module 412 would permit an administration to assign an application that may be needed by an individual, but not by others within the same role. For example, a vice president of sales may be assigned a role of vice president, but may need some but not all applications of the salesman role. Personal assignment module 412 would permit such customization.

The deployment console 400 can also manage versions of software for deployment by defining the current version of each offline application that should be installed. Version control module 416 provides an administrator with this functionality.

Storage media, such as database 418, keeps track of what software should be installed on each device for each user. This data stored therein is based upon the parameters set by role assignment module 410, personal assignment module 412 and version control module 416.

Storage media 436 is provided upon which software that may be downloaded to a device and installed thereupon is provided. Such software may include offline applications, modular offline application building blocks, patches, and other software.

Installation protocol module 434 is provided. It permits an administrator to update or alter installation protocol.

Device type/ID handler 440 is provided which determines how to handle different device types.

Installer 430 is provided that retrieves software from storage media 436 for downloading and installation on a device. This is done based upon the comparison of information from a registry service on a device to information stored in database 418 relating to what is supposed to be resident on that particular device. Additionally, installer 430 is equipped to provide mobile device with a deinstall instruction should the information from the registry service indicate that software is installed on the device that should not be.

When installer 430 retrieves software from storage media 436 and sends it off to a device and retrieves a notice from the device that the software was received, it stores the information relating to the download and install in install log 432. Install log 432, database 418, and storage media 436 may be collocated or separate. Moreover, they may be a part of deployment console 400 as shown, or alternatively, any of them may be located externally.

Figure 7:
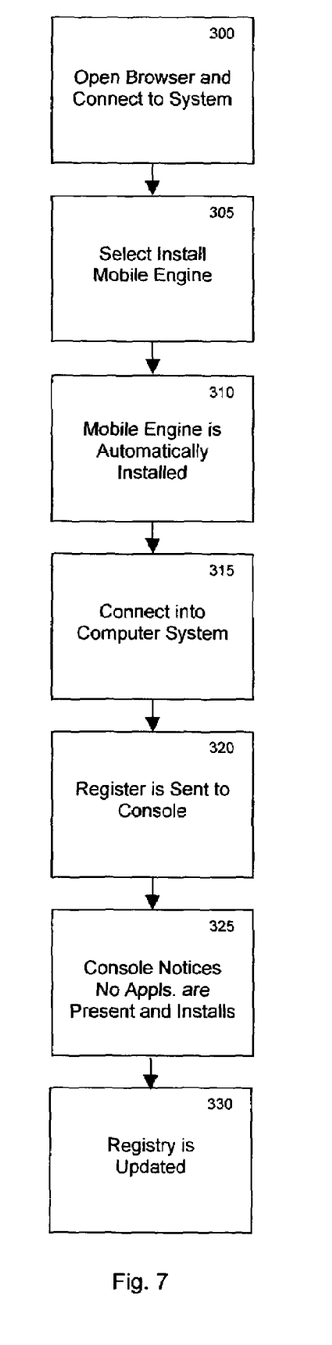
FIG. 7 is a flow chart illustrating a deployment process according to an embodiment of the present invention.

A process for deploying and installing the framework according to an embodiment of the present invention is shown in FIG. 7.

In order to install the mobile engine framework, a user opens browser 105 on mobile device 100 and connects to computer system 200 online as shown in step 300. Once online, an install mobile engine icon, hyperlink or the like is displayed. In step 305, the user selects to install mobile engine 110 by clicking on the icon, hyperlink or the like.

In step 310, the mobile engine framework is downloaded to mobile device 100 and, preferably, is automatically installed by installation service 165. Once installation is complete, the user connects into the deployment console system in step 315.

Upon this connection, a data container containing information from registry service 175 is sent to a deployment console on computer system 200. As shown in step 325, the console reads the registry and determines that no offline applications are currently installed on mobile device 100 and then downloads the appropriate applications that are supposed to reside on mobile device 100. These offline applications are installed automatically by installation service 165. Installation service 165 also automatically updates registry service 175 to reflect the installation of the new offline applications.

When a deployment console receives information from a registry service that indicates an outdated version of a program or a version requiring a patch is resident on a mobile device, the current version and/or patch can be sent to the device and installed and the old version deinstalled, as needed, just as any other program, as will be described with respect to FIG. 8. It should also maintain error logs sent by the mobile devices.

Figure 8:
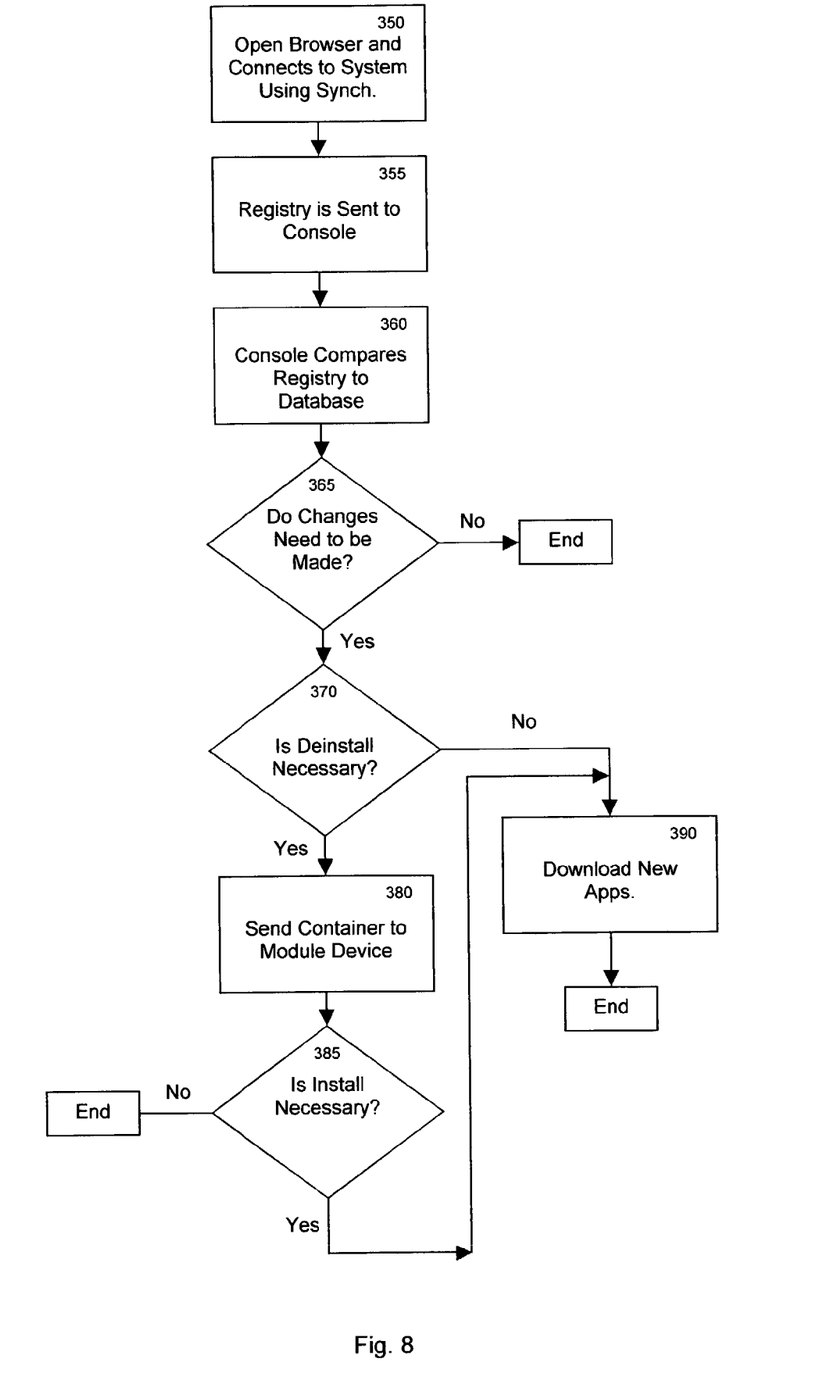
FIG. 8 is a flow chart illustrating a deployment process according to another embodiment of the present invention.

In FIG. 8, a process using the registry in association with the deployment console is depicted. In step 350, the user opens browser 105 and connects to computer system 200 through the Internet, or the like, using the synchronization function. As part of the synchronization process, mobile device 100 then sends a data container containing the data within the registry service 175 that is eventually retrieved by the deployment console as shown in step 355. This retrieval may be in the manner discussed above relating to the retrieval of data from data containers during the synchronization process.

The console then compares the data from registry service 175 to stored information that reflects what offline applications (or alternatively what software that is subject to deployment through deployment console) are supposed to be resident on mobile device 100 in step 360. In step 365, it is determined if changes need to be made to the mobile device. A few examples of changes that may need to be made include: 1) an offline application may no longer be authorized and may need to be deleted from the mobile device; 2) a new application may need to be added; 3) a new version of an existing application may need to be placed on the mobile device; 4) a patch for an existing application may need to be installed on the mobile device; 5) modular application building blocks may need to be deleted and/or installed; and 6) other software such as special extra HTML pages and/or graphics, for example, may need to be added or deleted, such as for a "Christmas" special.

If no changes need to be made, then the routine ends. If changes do need to be made, it is determined if a deinstall or an install needs to be performed. In step 370, it is determined if a deinstall is needed. If one is, then a data container is sent to mobile device 100 directing installation function 165 to deinstall the appropriate offline application or other software. It is then determined if an install is necessary in step 385. If no install is needed, then the routine ends. If an install is needed, in step 390, the offline application or other software to be installed is downloaded to-mobile device and installed automatically through the installation function 165.

This sending of the registry occurs each time there is a synchronization process. This way the deployment console keeps the mobile devices outfitted as they should be.

Although the preferred embodiments of the present invention have been described and illustrated in detail, it will be evident to those skilled in the art that various modifications and changes may be made thereto without departing from the spirit and scope of the invention as set forth in the appended claims and equivalents thereof.

What is claimed is:

1. A synchronization process for a device for synchronizing data between said device and a computer system comprising the steps of:
   creating a first data container to be sent to said computer system, said first data container comprising a body portion and a header portion,
   said body portion comprising data from an application executed on said device, said data from said application to be synchronized with said computer system,
   said header portion comprising a field for indicating which function module to call in said computer system to process said data from said application, a send date, a send time, an execution date, an execution time, and a status;
   storing said first data container on said device; sending said first data container to said computer system;
   sending during a synchronization a second data container including data that identifies one or more applications installed on said device; and
   receiving from said computer system a third data container that includes data for performance of an application update, wherein said update is determined by said computer system to be required based on a comparison of said data that identifies one or more applications with a stored identification of applications that should be installed on said device.

2. A synchronization process as in claim 1, wherein said header portion comprises a container ID, a user ID, an indication of a type of said container, and a method ID, a send date, a send time, an execution date, an execution time and a status.

3. A synchronization process as in claim 1, wherein said body portion comprises a container ID, line number, field name and field value.

4. A synchronization process as in claim 1, wherein said first data container is sent upon the existence of a connection to said computer system and an indication by a user that synchronization is desired.

5. A synchronization process as in claim 1, further comprising, receiving a fourth data container from said computer system in a common communication session in which said first data container is transferred to said computer system, wherein said fourth data container comprises information responsive to an earlier data container sent from said device to said computer system during a previous synchronization.

6. A synchronization process as in claim 1, further comprising, receiving a fourth data container from said computer system in a common communication session in which said first data container is transferred to said computer system, wherein said fourth data container comprises information responsive to said first data container.

7. A synchronization process as in claim 1, wherein said device comprises a personal digital assistant.

8. A synchronization process as in claim 1, wherein said device comprises a handheld computer.

9. A synchronization process as in claim 1, wherein said device comprises a laptop computer.

10. A synchronization process as in claim 1, wherein said device comprises a desktop computer.

11. A synchronization process as in claim 1, wherein said device comprises an Internet enabled phone.

12. A synchronization process as in claim 1, wherein said computer system comprises an applications server.

13. A synchronization process as in claim 1, further comprising the steps of:
    receiving an indication that said first data container was received by said computer system; and
    deleting said first data container off of said device upon receiving said indication.

14. A synchronization process as in claim 13, wherein said indication comprises a unique identification of said first data container.

15. A synchronization process as in claim 14, further comprising the step of writing said unique identification of said first data container in a history table after receiving said indication.

16. A synchronization process as in claim 15, further comprising the steps of:
    comparing said unique identification of said first data container to entries in said history table prior to sending said first data container;
    if said unique identification of said first data container matches an entry in said history table, deleting said first data container without sending said first data container.

17. A synchronization process as in claim 1, further comprising the step of, for entry of said data from said application, providing said application via an interface of a web server that has a same visual and behavioral appearance as an interface of said computer system that is provided when said application is executed on said computer system.

18. A synchronization process as in claim 17, wherein a servlet engine enables said application to be executed via said web server.

19. A synchronization process as in claim 1, further comprising the step of initially storing said data from said application in a database of said device; wherein:
an application program interface (API) layer forms an interface between said database and a plurality of applications including said application; and
said API layer provides for replaceability of one or more of said plurality of applications with one or more other applications while maintaining operability of said database and data of said database.

20. A synchronization process as in claim 19, wherein said API calls a first module for sending said first data container and calls a second module for sending said second data container.

21. A synchronization process as in claim 1, wherein:
if said required application update is an application uninstall, said data of said third data container includes an identification of an uninstall function module of said device for instructing said device to call said uninstall function module in response to receipt of said third data container; and
if said required application update is an application install, said data of said third container includes an identification of an install function module of said device for instructing said device to call said install function module in response to receipt of said third data container.

22. A synchronization process as in claim 1, wherein said second data container is sent during every synchronization.

23. A synchronization process as in claim 1, wherein to which of a plurality of stored identifications of applications said data that identifies one or more applications is compared depends on a user role assigned to the device.

24. A synchronization process as in claim 1, wherein:
said application is a shopping application; and
said data from said application is synchronized for an update of at least one of a catalog content and an order.

25. A synchronization process as in claim 1, wherein said synchronization process is triggered one of (a) in response to a click of one of an icon, a button, and a link and (b) in response to establishment of a connection between said device and said computer system.

26. A synchronization process as in claim 1, wherein:
said data from said application is entered while said device is connected to the computer system; and
said synchronization process is triggered in response to said data becoming available for transmission to the computer system.

27. A synchronization process as in claim 1, wherein Java code is executed to initiate said synchronization process.

28. A synchronization process for computer system for synchronizing data between said computer system and a device comprising the steps of:
receiving a first data container from said device, said first data container comprising a body portion and a header portion,
said body portion comprising data from an application executed on said device, said data from said application to be synchronized with said computer system,
said header portion comprising a field for identifying an application function module;
saving said first data container in memory associated with said computer system;
during a synchronization, receiving from said device a second data container including data that identifies one or more applications installed on said device;
reading a third data container intended for said device from said memory;
sending said third data container to said device;
based on a comparison of said data that identifies one or more applications with a stored identification of applications that should be installed on said device, determining whether an application update is required at said device;
if it is determined that the application update is required, sending to said device a fourth data container that includes data for performance of the application update;
reading out said first data container from said memory;
mapping said data of said body portion to said application function module;
calling said application function module to process said data of said body portion;
retrieving response data from said application function module;
creating a responsive data container comprising information related to said response data; and
saving said responsive data container in said memory.

29. A synchronization process as in claim 28, wherein said first data container is received upon the existence of a connection to said computer system and an indication by a user of said device that synchronization is desired.

30. A synchronization process as in claim 29, wherein said third and responsive data containers each comprises a header portion.

31. A synchronization process as in claim 30, wherein said header portions of said first, third, and responsive data containers each comprises a container ID, a user ID, an indication of a type of said container, a method ID, a send date, a send time, an execution date, an execution time and a status.

32. A synchronization process as in claim 30, wherein said body portion comprises a container ID, line number, field name and field value.

33. A synchronization process as in claim 29, wherein said third data container comprises information responsive to an earlier data container sent from said device to said computer system during a previous synchronization.

34. A synchronization process as in claim 29, wherein said third data container comprises information responsive to said first data container.

35. A synchronization process as in claim 29, further comprising the step of sending said responsive data container to said device.

36. A synchronization process as in claim 28, wherein said memory comprises first and second databases, said first database storing said first data container and said second database storing said third data container and said responsive data container.

37. A synchronization process as in claim 28, wherein said device comprises a personal digital assistant.

38. A synchronization process as in claim 28, wherein said device comprises a handheld computer.

39. A synchronization process as in claim 28, wherein said device comprises a laptop computer.

40. A synchronization process as in claim 28, wherein said device comprises a desktop computer.

41. A synchronization process as in claim 28, wherein said device comprises an Internet enabled phone.

42. A synchronization process as in claim 28, wherein said computer system comprises an applications server.

43. A synchronization process as in claim 28, further comprising the step of deleting said first data container from said memory after said responsive data container is stored in said memory.

44. A synchronization process as in claim 28, further comprising the step of deleting said responsive data container from said memory upon receipt of an indication from said device that said responsive data container was received.

45. A synchronization process as in claim 28, further comprising the steps of:
   receiving an indication that said third data container was received by said device; and
   deleting said third data container off of said computer system upon receiving said indication.

46. A synchronization process as in claim 45, wherein said indication comprises a unique identification of said third data container.

47. A synchronization process as in claim 46, further comprising the step of writing said unique identification of said third data container in a history table after receiving said indication.

48. A synchronization process as in claim 47, wherein sending a data container to said device comprises the steps of:
   comparing a unique data container identification received from said device to entries in said history table;
   if said unique data container identification matches an entry in said history table, deleting a data container corresponding to said entry without sending said corresponding data container; and
   sending to said device one or more data containers corresponding to one or more entries of said history table other than said entry.

49. A synchronization process as in claim 28, wherein said mapping comprises determining that said function module is most suitable of a plurality of function modules of said computer system for processing said data of said body portion, wherein said determination is based on mapping a structure of said first data container to an interface of said function module.

50. A synchronization process for a computer system for synchronizing data between a device and said computer system comprising the steps of:
   receiving from said device a first data container that includes a data to be processed by said computer system and an identification of an application function module to be called for processing said data to be synchronized;
   in response to receipt of said first data container, calling said application function module to process said data;
   retrieving response data from said application function module;
   creating a second data container that is responsive to said first data container, said second data container including information related to said response data;
   during a synchronization, receiving from said device a third data container including data that identifies one or more applications installed on said device;
   based on a comparison of said data that identifies one or more applications with a stored identification of applications that should be installed on said device determining whether an application update is required at said device;
   if it is determined that the application update is required, creating a fourth data container that includes data for performance of the application update; and
   sending said second and fourth data containers to said device.

51. A synchronization process as in claim 50, wherein said second data container is sent to said device during a synchronization in which said computer system receives said first data container from said device.

52. A synchronization process as in claim 50, wherein said computer system receives said first data container during a first synchronization and sends said second data container during a second synchronization after said first synchronization is completed.

53. A synchronization process as in claim 50, further comprising:
   receiving a fifth data container that includes a status-notification request regarding a status of previously sent data containers;
   retrieving all data containers stored in a memory at said computer system that are associated with a user who is also associated with said fifth data container; and
   sending said retrieved data containers to said device in response to receipt of said fifth data container;
   wherein said retrieved data containers include status data.

54. A synchronization process as in claim 50, further comprising:
   in response to receipt of said third data container, calling an application synchronization function module for performing said comparison;
   retrieving response data from said synchronization function module;
   wherein whether said device requires said application update is determined based on said response data retrieved from said synchronization function module.

55. A synchronization process as in claim 50, wherein:
   if said required application update is an application uninstall, said data of said fourth container includes an identification of an uninstall function module of said device for instructing said device to call said uninstall function module in response to receipt of said fourth data container; and
   if said required application update is an application install, said data of said fourth container includes an identification of an install function module of said device for instructing said device to call said install function module in response to receipt of said fourth data container.

56. A synchronization process as in claim 50, wherein said third data container is received during every synchronization.

57. A synchronization process for a device for synchronizing data between said device and a computer system comprising the steps of:
   creating a first data container that includes a data to be processed by said computer system and an identification of an application function module to be called by said computer system for processing said data to be processed;
   sending said first data container to said computer system;
   receiving from said computer system a second data container that is responsive to said first data container and includes information related to response data retrieved by said computer system from said application function module;
   during a synchronization, sending a third data container including data that identifies one or more applications installed on said device; and
   receiving from said computer system a fourth data container that includes data for performance of an application update, wherein said update is determined by said computer system to be required based on a comparison of said data that identifies one or more applications with a stored identification of applications that should be installed on said device.

58. A synchronization process as recited in claim 57, further comprising:

provi­ding a single user interface for receiving data entry in an offline mode and in an online mode;

prior to a particular synchronization, locally storing data entered in said offline mode, said data entered in said offline mode being sent during said particular synchronization in a data container that indicates a function module to be called for processing said data entered in said offline mode;

providing in said user interface a selectable control;

in response to a selection of said selectable control, initiating said particular synchronization in an online mode; and sending data entered in said online mode to said computer system without a corresponding data container that indicates a function module to be called.

59. A synchronization process for computer system for synchronizing data between said computer system and a device comprising the steps of:

receiving a first data container from said device, said first data container comprising a body portion and a header portion, said body portion comprising data from an application executed on said device, said data from said application to be synchronized with said computer system, said header portion comprising a field for identifying an application function module;

mapping said data of said body portion to said application function module;

calling said application function module to process said data of said body portion;

retrieving response data from said application function module;

sending to said device a second data container responsive to said first data container and comprising information related to said response data;

during a synchronization, receiving from said device a third data container including data that identifies one or more applications installed on said device;

based on a comparison of said data that identifies one or more applications with a stored identification of applications that should be installed on said device, determining whether an application update is required at said device; and if it is determined that the application update is required, sending a fourth data container that includes data for performance of the application update.

* * * * *